US008091773B2

(12) United States Patent
Ota et al.

(10) Patent No.: US 8,091,773 B2

(45) Date of Patent: Jan. 10, 2012

(54) SYSTEMS AND METHODS FOR AUTOMATIC PRINTER CONFIGURATION

(75) Inventors: Ken Ota, Cupertino, CA (US); Shawn Liang, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 631 days.

(21) Appl. No.: 12/240,861

(22) Filed: Sep. 29, 2008

(65) Prior Publication Data

US 2010/0078469 A1 Apr. 1, 2010

(51) Int. Cl.
*G06F 17/00* (2006.01)

(52) U.S. Cl. .................... 235/375; 325/380; 325/462.13

(58) Field of Classification Search .................. 235/375, 235/380, 462.13

See application file for complete search history.

(56) References Cited

U.S. PATENT DOCUMENTS

2006/0175399 A1* 8/2006 Steusloff et al. .............. 235/382
2007/0152058 A1* 7/2007 Yeakley et al. .......... 235/462.01
2007/0268320 A1* 11/2007 Silverbrook et al. ............ 347/9
2010/0079790 A1 4/2010 Liang

OTHER PUBLICATIONS

Office Action dated Jun. 7, 2011 in U.S. Appl. No. 12/416,130, filed Mar. 31, 2009.
Office Action dated Aug. 24, 2011 in U.S. Appl. No. 12/416,130, filed Mar. 31, 2009.

* cited by examiner

*Primary Examiner* — Karl D. Frech

(74) *Attorney, Agent, or Firm* — Finnegan, Henderson, Farabow, Garrett & Dunner, L.L.P.

(57) ABSTRACT

Apparatus, systems, and methods consistent with disclosed embodiments permit the automatic configuration of printers based on the generic physical characteristics of print media by using a product code associated with the print media. Printer configuration settings associated with the product code are retrieved and used to automatically configure an input tray by detecting status information pertaining to input trays during a specified time interval around the time the product code was received.

20 Claims, 3 Drawing Sheets

SYSTEMS AND METHODS FOR AUTOMATIC PRINTER CONFIGURATION

BACKGROUND

1. Field of the Invention

The present invention relates to the field of printers, and in particular to systems and methods for the automatic configuration of printers.

2. Description of Related Art

Computer printers, which are increasingly used for both business and personal applications, are extremely configurable and offer a variety of customization possibilities. Users often customize printers by changing printer configuration settings using a user interface. The user interface may be associated with a print console, print controller, or provided on the user's computer through a print driver. The printer may be customized to suit individual preferences and/or tailored to the task at hand.

The plethora of print options provided to users also creates a raft of complexities. Users are often confused by the large number of options provided, or by the impact of one or more settings on print speed and quality, and by the terminology used to describe the various options. Thus, despite the proliferation of user-friendly interfaces and help-menus, the proper configuration of printers often proves daunting to everyday users. Indeed, the wide availability and frequent use of printers do not appear to have alleviated these problems.

Printer manufactures have responded to these challenges by providing task-based configuration for printers. For example, a user may select one of various printing modes on a printer such as a "draft mode," which may increase throughput and conserve toner or ink, but at the cost of relatively lower quality output. In addition, a "photo mode," a "default mode," and various other printing modes may be provided. Each printing mode is typically associated with a printer configuration setting that comprises a set of predefined values for one or more configurable operational parameters associated with the printer. Thus, for example, when a user selects "draft mode"—a printer may be configured to print double-sided, monochrome copies at a lower print resolution such as 150 dots per inch ("dpi").

However, print quality is also dependent to a large extent on generic physical characteristics of the print medium used. The thickness of the print media, its translucency, reflectivity, and other physical properties impact the quality of print output. Accordingly, printer configuration must also be changed based on the type of print media being used. Because print media is typically mass-produced individual variations in media characteristics will be minimal and can be ignored. Therefore, many physical media characteristics may be treated as generic for a particular media product and a printer may be configured appropriately, when that media product is used.

Unfortunately, such configuration changes are not always easy for users to make. Moreover, given the many types of print media available, selecting the right configuration settings may involve a lot of trial and error leading to a waste of time and resources. Moreover, there is no easy way for a user to determine and/or specify the characteristics of the print media used so that an optimal configuration setting can be determined. Finally, because modern office printers may have multiple input trays and the input trays may contain different media types, there is no easy mechanism to specify printer configuration settings corresponding to the particular print media product in each input tray.

Therefore, there is a need for systems and methods to automatically configure printers for optimal performance that accounts for generic physical characteristics of print media used in printers.

SUMMARY

In accordance with disclosed embodiments, apparatus, systems, and methods for automatically configuring printers to account for generic physical characteristics of print media are presented. In some embodiments, an apparatus for printing documents comprises at least one input tray capable of holding print media; at least one sensor, which is capable of reading and decoding a product code associated with the print media; and a configuration management module capable of detecting the status of the input tray. In some embodiments, the configuration management module may further comprise a database, wherein the database holds printer configuration settings corresponding to product codes. The configuration management module receives a decoded product code from the sensor; retrieves a configuration setting corresponding to the product code from the database; and associates the configuration setting with the input tray based on the status of the input tray.

Embodiments disclosed also pertain to systems, methods, and program instructions embodied in computer-readable media for automatically configuring printers to account for generic physical characteristics of print media. These and other embodiments are further explained below with respect to the following figures.

DETAILED DESCRIPTION

In accordance with the present invention, systems and methods for securely printing documents are presented.

Figure 1:
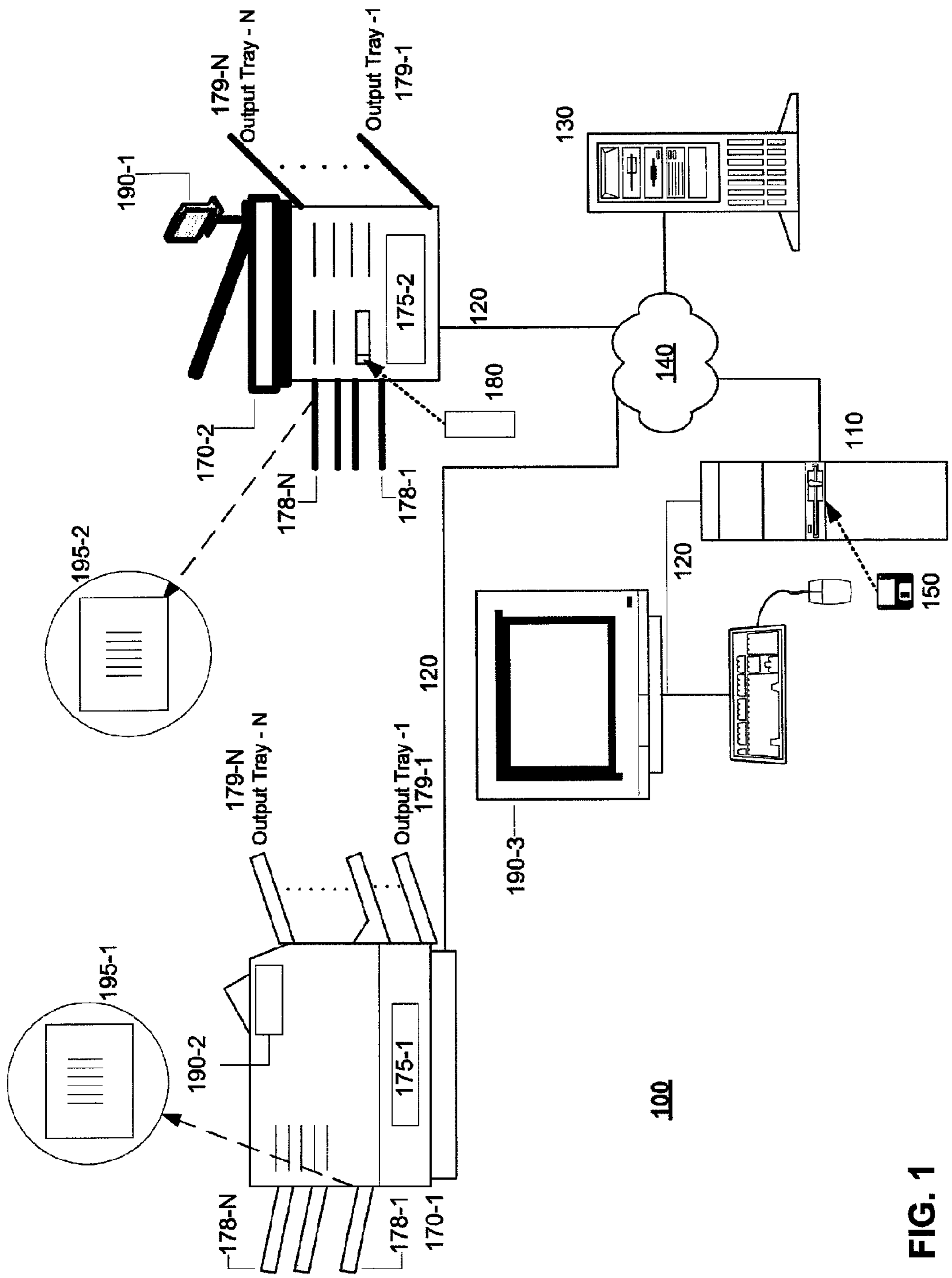
FIG. 1 shows a block diagram of a system for automatically configuring printers to account for generic physical characteristics of print media.

FIG. 1 shows a block diagram of exemplary system 100 for configuring printers to account for generic physical characteristics of print media. Generic physical characteristics of print media pertain to those physical characteristics of print media that affect the quality of print output for a particular print media product. Physical characteristics of media include such aspects as thickness, weight, color, reflectivity, translucency, capacity to absorb ink or toner, speed at which ink or toner dries, etc. These characteristics may affect the quality of printed output. Accordingly, configuration settings on a printer may be adjusted or fine-tuned to produce optimal print quality based on the values of these physical characteristics.

Typically, generic physical characteristics for print media will be identical for the same product, but may differ for different products even when they share a common brand. For example, brand A product X A4 size paper may have one set of generic physical characteristics, while brand A product Y A4 size paper may have a different set of generic physical characteristics. In this regard, some portion of a product code, such as the Universal Product Code ("UPC"), or any other manufacturer labeling associated with a product may be used to determine products that will share (or differ) with respect to generic physical characteristics.

A computer software application consistent with the present invention may be deployed on a network of computers and/or printers, as shown in FIG. 1, that are connected through communication links that allow information to be exchanged using conventional communication protocols and/or data port interfaces.

As shown in FIG. 1, exemplary system 100 includes a computer or computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may also be capable of executing software (not shown) that permits the configuration of printers to account for generic physical characteristics of print media. For example, computing device 110 or server 130 may include relational databases or tables and user-interfaces capable of providing access information stored in the databases. In some embodiments, the databases or tables may include information pertaining to print media.

Printers 170 may be laser printers, ink jet printers, LED printers, plotters, multi-function devices, or other devices that are capable of printing documents. Computing device 110 may contain a removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. Portions of software applications may reside on removable media and be read and executed by computing device 110 using removable media drive 150.

Connection 120 couples computing device 110, server 130, and printers 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB™, SCSI, FIREWIRE™, and/or BNC ports for transmission of data through the appropriate connection 120. The communication links could be wireless links or wired links or any combination that allows communication between computing device 110, server 130, and printers 170.

Network 140 could include a Local Area Network (LAN), a Wide Area Network (WAN), or the Internet. Exemplary printer 170-2, may be a network printer, and can be connected to network 140 through connection 120. System 100 may include multiple printers 170 and other peripherals (not shown). Printers 170 may be controlled by hardware, firmware, or software, or some combination thereof. Printers 170 may include one or more print controller boards 175, such as exemplary print controllers 175-1 and 175-2, which may control the operation of printers 170. In general, print controllers 175 may be internal or external to printers 170. In some embodiments, printers 170 may also be controlled in part by software, including print servers, printer drivers, or other software, running on computing device 110 or server 120.

Printers, such as exemplary printers 170, may also include consoles 190 such as consoles 190-1 and 190-2, or other interfaces to allow operational parameters to be set, passwords and/or user identification and authentication information to be entered, and other messages to be displayed. In some embodiments, operational parameters may be set or displayed using a display or user-interface on a monitor for a computer coupled to printers 170. For example, user interfaces to set or display one or more operational parameters on printer 170-1 may be displayed on monitor 190-3, which is coupled to computer 110. A user interface to set or display operational parameters on printer 170-2 may also be displayed on monitor 190-3, using software running on server 130.

In some embodiments, operational parameters pertaining to printer 170 may be user-configurable. For example, the print resolution, document sizes, color options, and other operational parameters may be user-configurable. Users may also be able to log into a printer 170 to perform administrative functions such as to enable software or firmware on printer 170, update database(s) resident on printer 170, and/or to perform various other functions. In some embodiments, the log in process may require a password or other user-authentication mechanism.

A user may also be able to specify input trays 178 and/or output trays 179 and the use of automatic document feeders to allow batch processing of documents. In some embodiments, one or more input trays 178 on printers 170 may be coupled to a sensor 195, which may take the form of a bar code reader, an RFID reader, a data glyph reader, or any other automatic identification and/or data capture device. In some embodiments, each input tray 178 may be coupled to a distinct sensor 195. (Sensor i may be coupled to input tray i). Sensor 195 may be capable of reading and decoding appropriately encoded electronically readable product code information present on print media packaging, or on print media. For example, the packaging enclosing a ream of paper may have electronically readable information, which may be read and decoded by sensor 195. As another example, a specified location on the first sheet or last sheet of a ream of paper may have electronically readable information, which may be read and decoded by sensor 195.

As shown in FIG. 1, sensors 195-1 and 195-2 are coupled to input tray 178-1 on printer 170-1, and input tray 178-N on printer 170-2, respectively. In some embodiments, each input tray on printers 170 may have a distinct coupled sensor 195. In another embodiment, sensor 195 may be coupled to consoles 190 or any other appropriate functional unit on printers 170 and may be shared by one or more input trays 178. Data read by sensors 195 may be processed and displayed on consoles 195.

A computer software application consistent with disclosed embodiments may be deployed on any of the exemplary computers, or printers as shown in FIG. 1. For example, printer 170 could execute software, such as an application for configuring printer 170 to account for generic physical characteristics of print media. An independent application may also execute concurrently on computing device 110. In another example, an application resident on print controller 175-1 could be configured using computer 110 but execute on printer 170-1. In general, applications may execute in whole or in part on one or more computers, print controllers, or printers in the system. The embodiments described above are exemplary only and other embodiments and implementations will be apparent to one of reasonable skill in the art.

Figure 2:
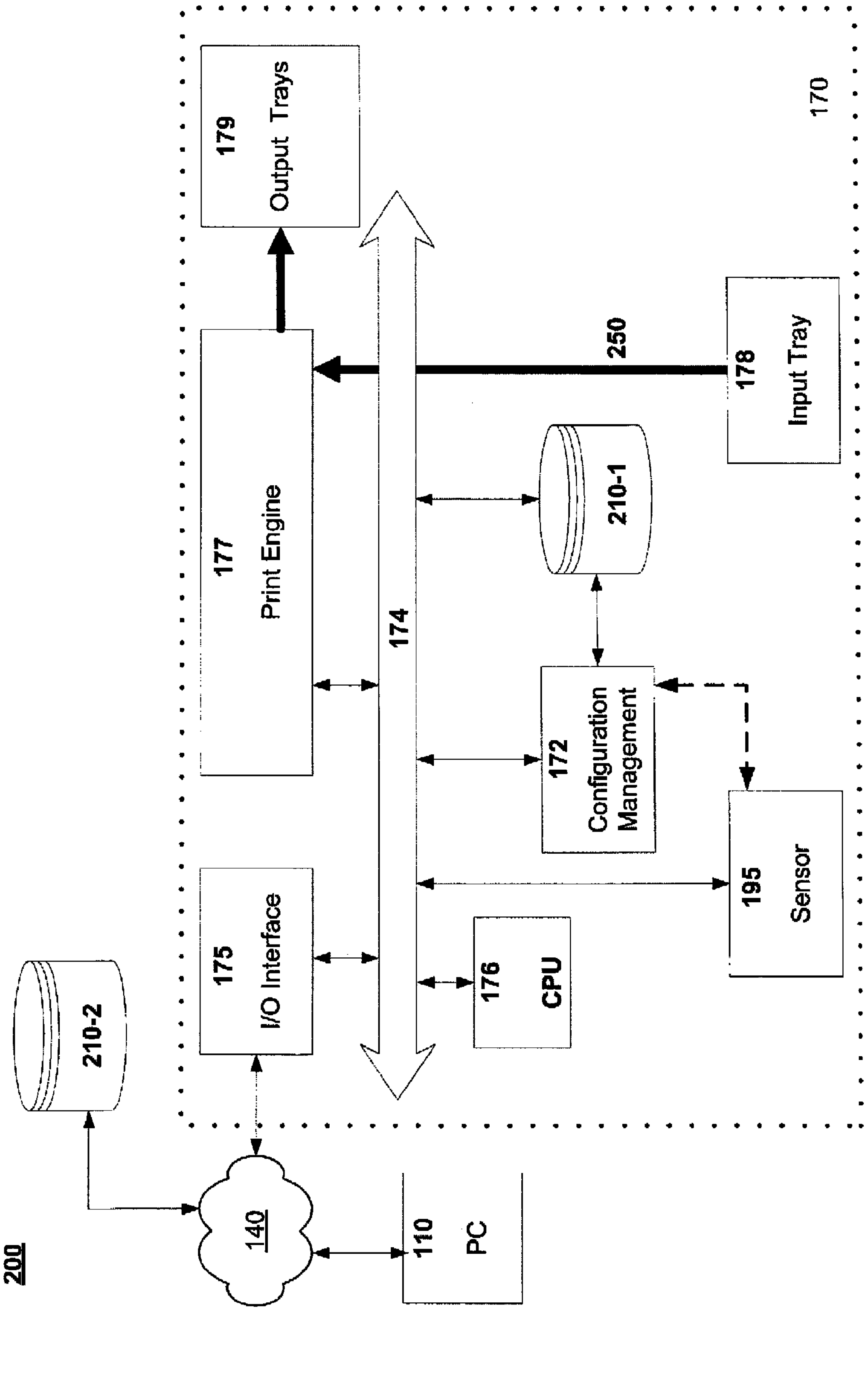
FIG. 2 shows a block diagram illustrating components and functional modules of an exemplary printer capable of being automatically configured to account for generic physical characteristics of print media.

FIG. 2 shows a block diagram illustrating components and modules in an exemplary printer system for automatically configuring printers to account for generic physical characteristics of print media. For simplicity, only the major blocks, functional modules, connections, and couplings have been indicated in FIG. 2. In FIG. 2, the dark arrows of heavier weight indicate a print media feed path, or a paper feed path, from input tray(s) 178 to output tray(s) 179.

In some embodiments, printer 170 may contain bus 174 that couples Central Processing Unit ("CPU") 176, input-output ("I/O") interface 175, print engine 177, sensor 195, database 210-1, and configuration management module 220. Printer 170 may also contain other devices (not shown) such as firmware, ROM, memory (RAM), secondary storage, Application Specific Integrated Circuits ("ASIC"s), and/or Field Programmable Gate Arrays ("FPGA"s) that are capable of storing and/or executing portions of an application to manage the printing of documents according to disclosed embodiments.

In some embodiments, printer 170 may also be able to access database 210-2, secondary storage, or other memory in computing device 110 using I/O interface 175 and network 140. In some embodiments, printer 170 may also be capable of executing software including a printer operating system, database management software, and other appropriate application software. In some embodiments, configuration settings on printer 170 may be controlled using configuration management module 172.

In some embodiments, CPU 176 may be a general-purpose processor, a special purpose processor, a Micro Control Unit ("MCU"), or an embedded processor. CPU 176 can exchange data including control information and instructions with I/O interface 175, print engine 177, and configuration management module 172. CPU 176 may execute instructions and routines stored in firmware including but not limited to a boot-up sequence, pre-defined routines, memory management routines, database update routines, and other code. In some embodiments, code and data in firmware may be copied to memory prior to being acted upon by CPU 176. In some embodiments, firmware may include routines and/or tables to assist configuration management module 172. In some embodiments, data and instructions in firmware 171 may be upgradeable. In some embodiments, CPU 176 may act upon instructions and data and provide control and data to print engine 177 to generate printed documents.

Exemplary I/O interface 175 receives data from computing device 110, which may be a personal computer. In some embodiments, I/O interface 175 may receive data from computing device, or database 210-2 over network 140. The data may be placed on bus 174, where it may be processed by CPU 176 and/or configuration management module 172. When data is ready for printing, CPU 176 may initiate the process of placing marks on a print medium by sending an appropriate notification to print engine 177. Based on the configuration of printer 170 and/or instructions contained in the print job, print engine 177 may place appropriate markings on the media. Print media may be obtained from an appropriate input tray 178. For example, configuration settings for printer 170 may be changed and/or updated based on generic physical characteristics of print media contained in an input tray 178, or those specified for the print job and print engine 177 may use the updated configuration settings when printing. If no input tray 178 has been specially designated then media may be obtained from any appropriate input tray 178 based on a current and/or a default printer configuration.

Product code data pertaining to or associated with new print media introduced into an input tray may be read and decoded by sensor 195, which may be coupled to one or more of input tray 178, bus 174, and/or configuration management module 172. Typically the electronically readable product code is a bar code is present on print media packaging, and information contained in the bar code may be used to identify the specific media product. In some embodiments, sensors 195 may be capable of reading product code information present on new print media, or on the packaging for the new print media. For example, the user may scan the product code such as a bar code, UPC code, or any other electronically readable marking on the packaging for print media prior to, during, or after the introduction of media into input tray 178 on printer 170.

When there is a one-one correspondence between sensors 195 an input tray 178 (i.e. each input tray 178 is coupled to a distinct sensor 195) then input tray 178 into which new print media will be (or has been) introduced may be identified based on the sensor 195 used to scan the bar code associated with the new print media. For example, if sensor i coupled to input tray i is used, then input tray i may be identified as the input tray associated with the new print media. When printer 170 has a single sensor 195 coupled to it (or when sensor 195 is shared by multiple input trays 178), then input tray 178 into which media is introduced may be identified as: (i) the first input tray 178 that is opened following the scanning (or receiving) of the product code; or (ii) the most recently opened input tray 178 preceding the product code scan or reception, if no input tray 178 is opened following some specified time interval after the scanning or receiving of the product code; or (iii) an input tray 178 that was already open when the product code is scanned; or (iv) an input tray 178 that is designated by default.

In some embodiments, the user may be asked to confirm that input tray 178 automatically identified by printer 170 following a product-code scan is the correct input tray 178 into which media will be (or has been) introduced. In some embodiments, sensor 195 may be permitted to scan a product code associated with print media after opening an input tray 178 into which media will be introduced. The opened input tray 178 will then be identified as the input tray 178 associated with the newly introduced print media.

Information read by sensor 195 may then be decoded and conveyed to print controllers 175, consoles 190, configuration management module 172, or another functional unit such as CPU 176 in printer 170. In some embodiments, the information read by sensor 195 may also be conveyed to computer 110 and/or database 210-2, using network 140.

Configuration management module 172 engine may use the decoded product data provided by sensor 195 to determine generic physical characteristics of print media for an input tray and change printer configuration settings appropriately. For example, configuration management module 172 may query database 210-1 and/or database 210-2 for an appropriate configuration setting using the decoded product information. In general configuration management module 172 may be implemented by hardware, software, firmware, or some combination thereof. For example, configuration management module 172 may extract relevant portions of the decoded product information (such as a portion of the UPC information) provided by manufacturer of print media and use the extracted information to query databases 210-1 and/or 210-2.

In some embodiments, printer 170 may also include (or have access to) databases 210, which may contain information related to configuration settings that are dependent on generic physical characteristics of print media. For example, databases 210-1 and/or 210-2 may use some portion of the UPC or any other electronically readable manufacturer provided product-related information as a primary key to store and/or retrieve pre-defined values of operational parameters for a print configuration setting. The print configuration setting retrieved from database 210 may comprise pre-defined optimal values of operational parameters for printer 172 corresponding to the print media associated with the UPC or product code.

In some embodiments, manufacturer information or UPC codes for some popular or commonly-used print media products may be stored in database 210-1 by the printer manufacturer at the time printer 170 is manufactured or shipped. In one embodiment, information in database 210 may be updated periodically by printer 170 by downloading updated information from a network accessible server, or database 210-2. In another embodiment, printer 170 may update database 210-1, whenever an unrecognized product code is encountered. In one embodiment, printer 172 may not contain a database and may download configuration setting information from network accessible database 210-2 whenever different print media is introduced into an input tray 178.

Because the input tray containing the print media can be automatically determined as described above, the retrieved printer configuration settings may be associated with the appropriate input tray 178 by configuration management module 172. When printer 172 uses media from an input tray 178, configuration management module 172 may change the values of operational parameters of printer 172 based on the configuration setting associated with input tray 178. Print engine 177 may then place markings on print media based on the updated configuration settings and the printed media may be routed to an output tray 179.

Figure 3:
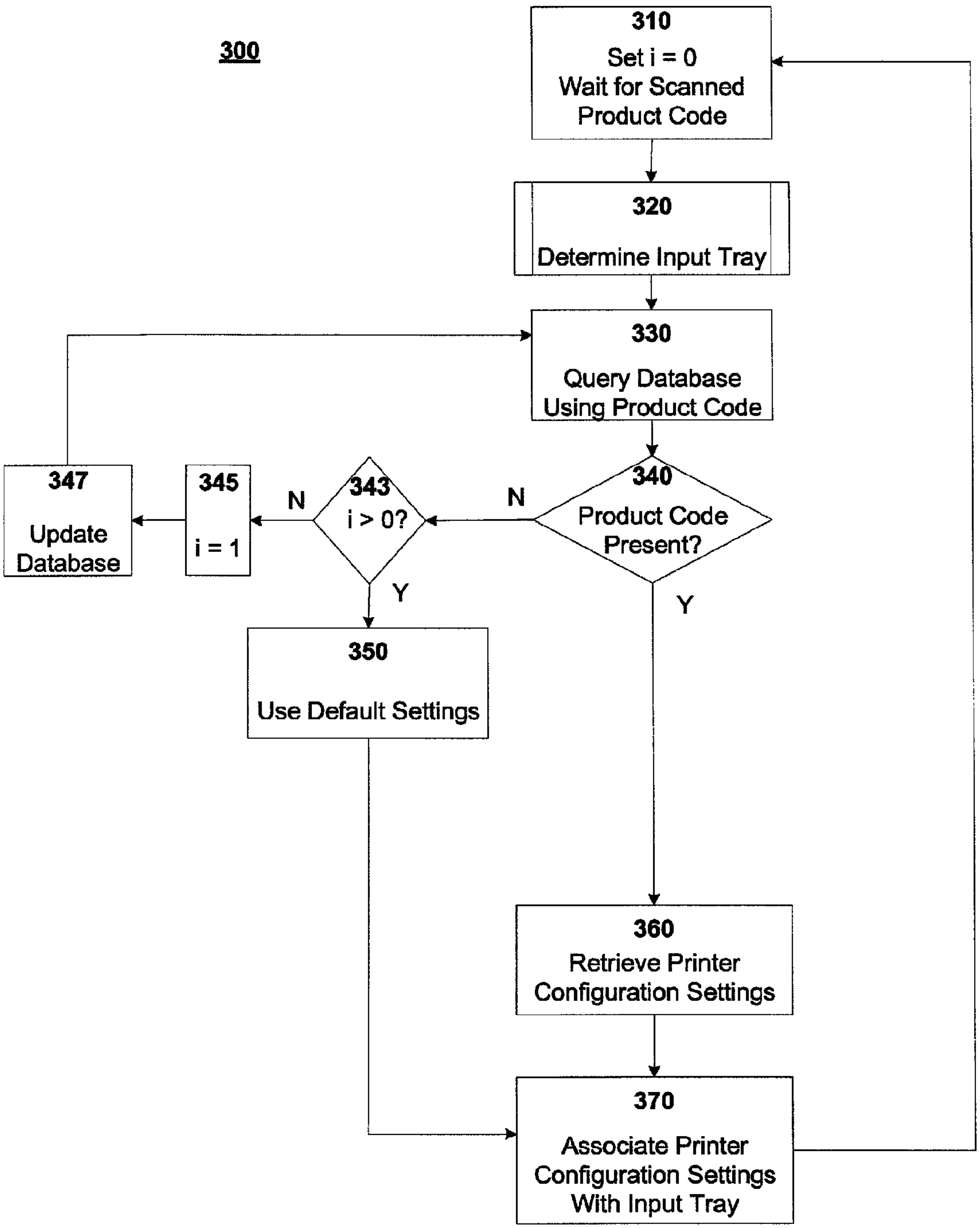
FIG. 3 shows a flowchart depicting an exemplary method 300 for automatically configuring printers to account for generic physical characteristics of print media.

FIG. 3 shows a flowchart depicting an exemplary method 300 for automatically configuring printers to account for generic physical characteristics of print media. In some embodiments, portions of method 300 may be performed by configuration management module 172. In some embodiments, configuration management module 172 may be software or firmware executed by CPU 176. The algorithm may commence in step 310, where it may wait for scanned and decoded product code input and may initialize the value of a counter i. The counter i can be used to determine the number of updates made to database 210 during the processing of a single product code. In some embodiments, scanned product input may be received from sensor 195.

In step 320, the algorithm may determine the input tray associated with scanned product code and the new print media being introduced. As previously described, when there is a one-one correspondence between sensors 195 an input tray 178 (i.e. each input tray 178 is coupled to a distinct sensor 195) then input tray 178 into which new print media will be (or has been) introduced may be identified based on the sensor 195 that scanned (and sent) the scanned product code. When printer 170 has a single sensor 195 (or when a sensor 195 is shared by multiple input trays 178), then input tray 178 into which media is introduced may be identified as: (i) the first input tray 178 that is opened following the scanning or reception of the product code; or (ii) the last input tray 178 opened, if no input tray 178 is opened following some specified time interval after the scanning or reception of the product code; or (iii) an input tray 178 that was already open when the product code is scanned or received; or (iv) an input tray 178 that is designated by default. In some embodiments, the user may be prompted to confirm the automatically determined input tray 178.

In step 330, database 210 may be queried for printer configuration settings using the product code or some relevant extracted portion of the product code. In some embodiments, database 210 may correspond to one or more of databases 210-1 and 210-2. Next, in step 340, the algorithm may determine if the product code exists in database 210. If the product code exists ("Y" in step 340) in database 210 then printer configuration settings may be retrieved from database 210 in step 360.

If the product code does not exist ("N" in step 340) then the value of the counter i may be checked in step 343. If i>0, ("Y" in step 343) then i can be set to 1 in step 345, to indicate that an update to the product code database will occur. Next, in step 347, database 210 may be updated. In some embodiments, the update may occur by downloading new product codes from a network accessible server 130, or network accessible database 210-2. In some embodiments, instead of a counter used for each product code processed, database 210 may be updated periodically and the algorithm may be modified appropriately. The algorithm then returns to step 330, where database 210 is queried again.

If i is not greater than 0, ("Y" in step 343) corresponding to the situation when the product code does not exist in database 210 even after an updating database 210, then the algorithm may proceed to step 350. In step 350, default settings may be used or may be retrieved from database 210.

In step 370, the printer configuration settings (retrieved or default) may be associated with input tray 178. The algorithm then returns to step 310 for a subsequent iteration, awaiting new product code input from sensor 195.

Further, methods consistent with disclosed embodiments may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware.

Embodiments disclosed also relate to compute-readable media and/or memory that include program instructions or program code for performing various computer-implemented operations based on the methods and processes of embodiments of the invention. The program instructions may be those specially designed and constructed, or they may be of the kind well known and available to those having skill in the computer arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A printer comprising:

at least one input tray capable of holding print media;

at least one sensor, the at least one sensor capable of reading and decoding a product code associated with the print media; and a configuration management module capable of detecting the status of the at least one input tray, the configuration management module comprising:

a database, wherein the database holds printer configuration settings corresponding to product codes; and wherein the configuration management module:

receives a decoded product code from the sensor at a first time;

retrieves a printer configuration setting corresponding to the product code from the database; and associates the printer configuration setting with the at least one input tray that was open at the first time.

2. The printer of claim 1, wherein each image at least one sensor is coupled to a distinct input tray.

3. The printer of claim 2, wherein the image at least one sensor is capable of detecting markings on the first or last sheet of a ream of print media in the input tray.

4. The printer of claim 2, wherein the configuration management module associates the configuration setting with the input tray by identifying the sensor sending the product code and determining the distinct input tray to which the sensor is coupled.

5. The printer of claim 1, wherein the product code comprises an UPC code.

6. The printer of claim 1, wherein the printer may update the database by downloading additional printer configuration settings corresponding to product codes over a network.

7. The printer of claim 1, wherein the sensor is at least one of:

a bar code reader;

a data glyph reader; and an RFID reader.

8. A method for automatically configuring printers based on the generic physical characteristics of at least one print media, the method comprising:

receiving a product code associated with the print media at a first time;

retrieving printer configuration settings associated with the product code;

detecting status information pertaining to at least one input tray at the first time, wherein the status information includes information relating to the at least one input tray that was open at the first time; and associating the retrieved printer configuration settings with the at least one input tray that was open at the first time.

9. The method of claim 8, wherein the product code is a UPC code.

10. The method of claim 8, wherein the printer configuration settings associated with the product code are retrieved from a database coupled to the printer.

11. The method of claim 8, wherein the database may be updated by downloading additional printer configuration settings corresponding to product codes over a network.

12. The method of claim 8, wherein the product code is received from at least one sensor coupled to the printer.

13. The method of claim 12, wherein the at least one sensor is coupled to the at least one input tray.

14. The method of claim 8, wherein the method is performed on a printer.

15. A computer-readable medium that stores instructions, which when executed by a computer performs steps in a method automatically configuring printers based on the generic physical characteristics of at least one print media, the steps comprising:

receiving a product code associated with the print media at a first time;

retrieving printer configuration settings associated with the product code;

detecting status information pertaining to at least one input tray at the first time, wherein the status information includes information relating to the at least one input tray that was open at the first time; and associating the retrieved printer configuration settings with the input tray based on the at least one input tray that was open at the first time.

16. The computer-readable medium of claim 15, wherein the product code is a UPC code.

17. The computer-readable medium of claim 15, wherein the printer configuration settings associated with the product code are retrieved from a database coupled to the printer.

18. The computer-readable medium of claim 17, wherein the database may be updated by downloading additional printer configuration settings corresponding to product codes over a network.

19. The computer-readable medium of claim 15, wherein the product code is received from at least one sensor coupled to the printer.

20. The computer-readable medium of claim 19, wherein the at least one sensor is coupled to the at least one input tray.

* * * * *